(12) United States Patent
Kanbe

(10) Patent No.: US 12,712,720 B2
(45) Date of Patent: Aug. 18, 2026

(54) MEMORY SYSTEM

(71) Applicant: Kioxia Corporation, Tokyo (JP)

(72) Inventor: Yuki Kanbe, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 394 days.

(21) Appl. No.: 18/182,427

(22) Filed: Mar. 13, 2023

(65) Prior Publication Data

US 2023/0344623 A1 Oct. 26, 2023

(30) Foreign Application Priority Data

Apr. 26, 2022 (JP) ................................ 2022-072505

(51) Int. Cl.
*H04L 9/08* (2006.01)
*G06F 3/06* (2006.01)
*H04L 9/32* (2006.01)

(52) U.S. Cl.
CPC .......... *H04L 9/0861* (2013.01); *G06F 3/0623* (2013.01); *G06F 3/0637* (2013.01); *G06F 3/0679* (2013.01); *H04L 9/0894* (2013.01); *H04L 9/321* (2013.01)

(58) Field of Classification Search
CPC ..... H04L 9/0861; H04L 9/0894; H04L 9/321; G06F 3/0623; G06F 3/0637; G06F 3/0679
USPC .......................................................... 713/190
See application file for complete search history.

(56) References Cited

U.S. PATENT DOCUMENTS 9,665,501 B1 5/2017 Obukhov et al.
10,778,417 B2 9/2020 Bolotin et al.
2017/0017810 A1 1/2017 Bolotin et al.
2020/0244458 A1* 7/2020 Kanbe .................. G06F 3/0637
2020/0287716 A1* 9/2020 Zitlaw ....................... H04L 9/14
2020/0313911 A1* 10/2020 Mondello ............ H04L 9/3247
2021/0248227 A1* 8/2021 Yang ...................... G06F 21/53
2021/0328786 A1* 10/2021 Wei ...................... H04L 9/3247

FOREIGN PATENT DOCUMENTS

JP 2020-119298 A 8/2020
JP 6938602 B2 9/2021

* cited by examiner

*Primary Examiner* — Linglan Edwards
*Assistant Examiner* — Phuc Pham
(74) *Attorney, Agent, or Firm* — Oblon, McClelland, Maier & Neustadt, L.L.P.

(57) ABSTRACT

According to one embodiment, a memory system includes a nonvolatile memory and a controller. The controller is communicable with a host and is configured to control the nonvolatile memory. The controller is configured to when receiving a key generation command from the host, generate an encryption key by an encrypting and decrypting function unit, store the encryption key in the nonvolatile memory, and transmit an identifier of the encryption key to the host.

11 Claims, 8 Drawing Sheets

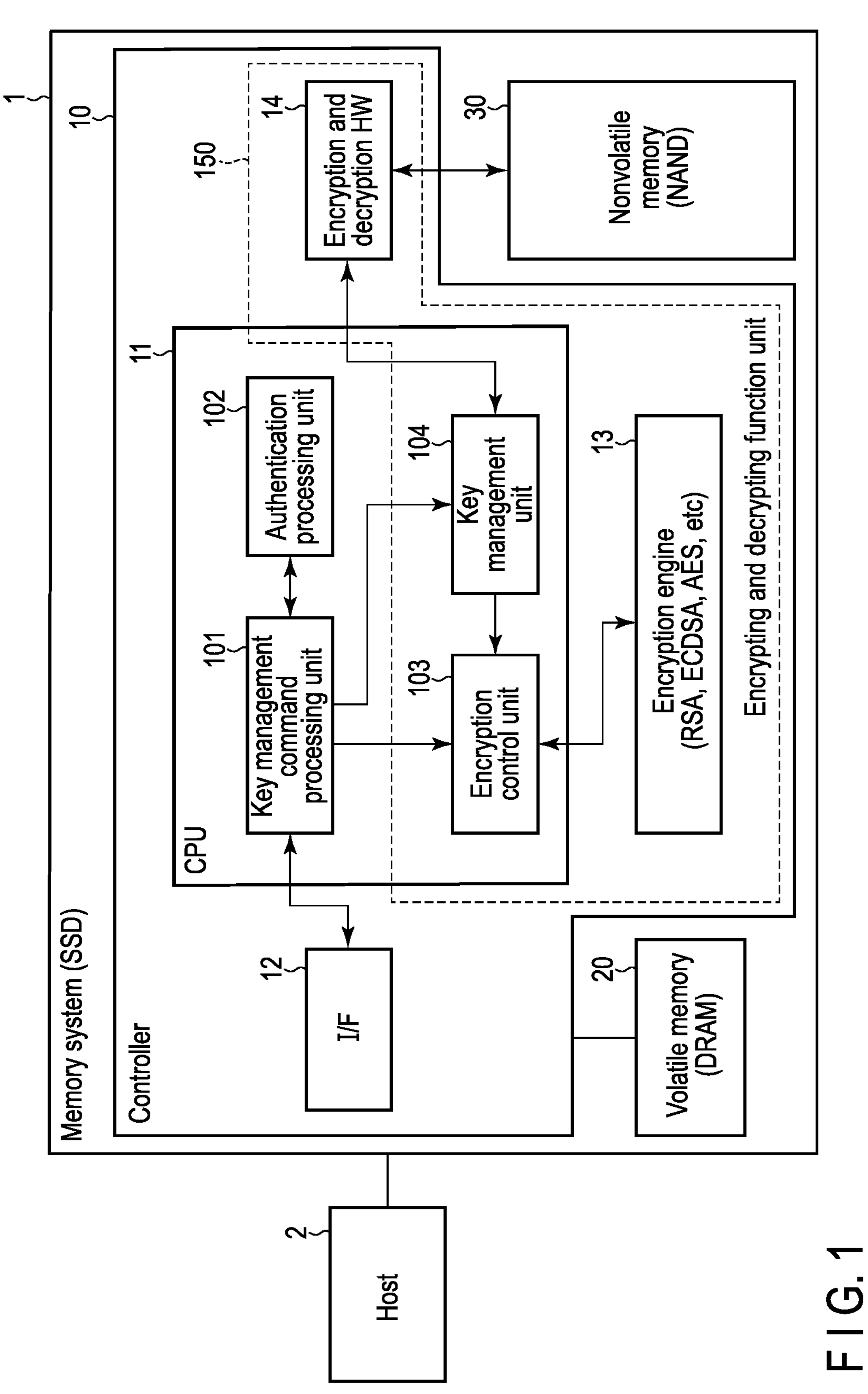
F I G. 1

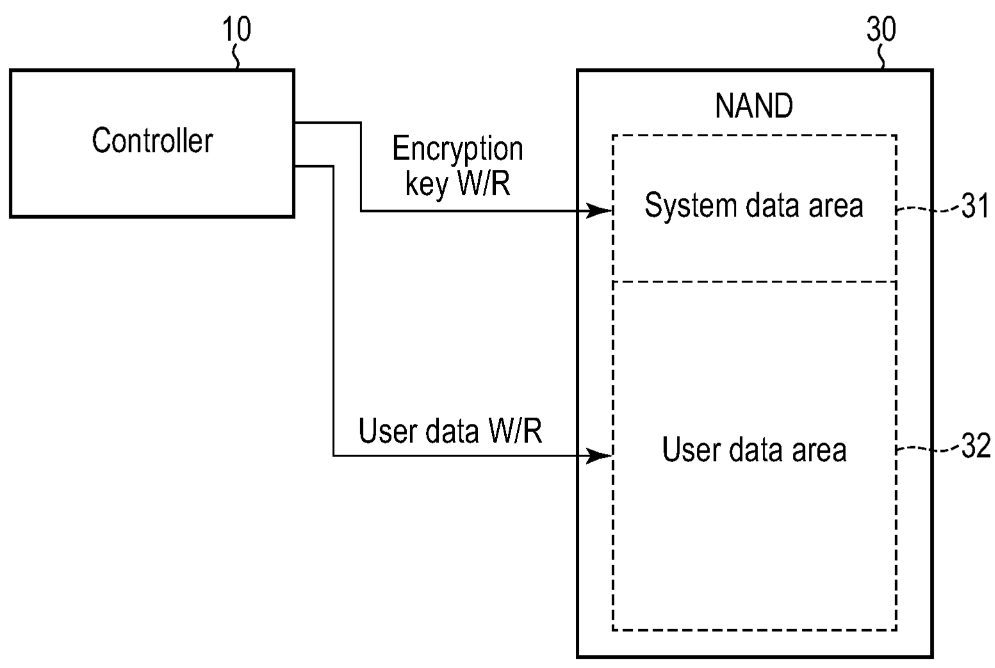
F I G. 2
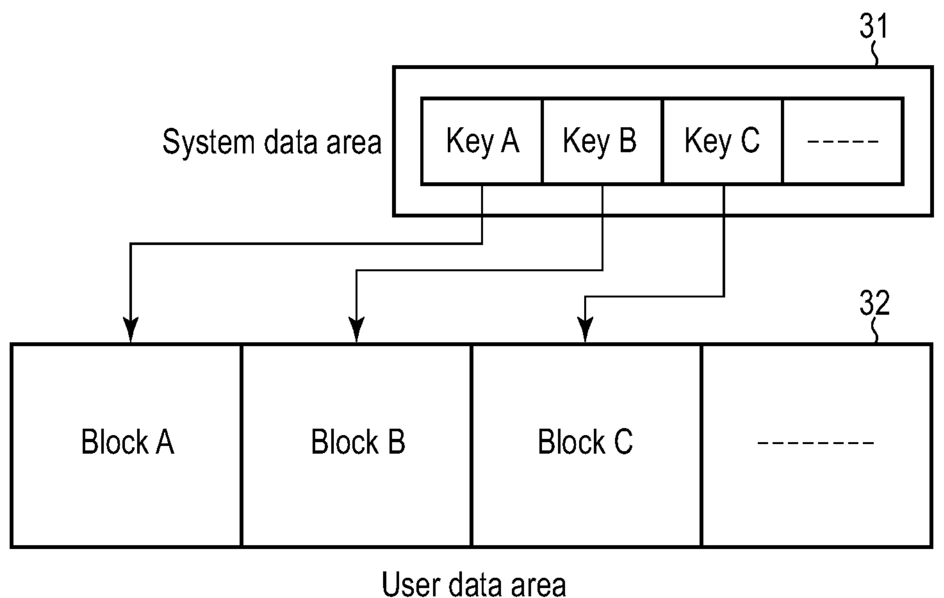
F I G. 3

| Command | |
|---|---|
| Extended command | |
| Key generation command | Corresponding to HSM |
| Signature command | |
| Encryption command | |
| Decryption command | |
| Public key acquisition command | |
| User setting command | Corresponding to TCG |
| Authority setting command | |
| Password change command | |

FIG. 4

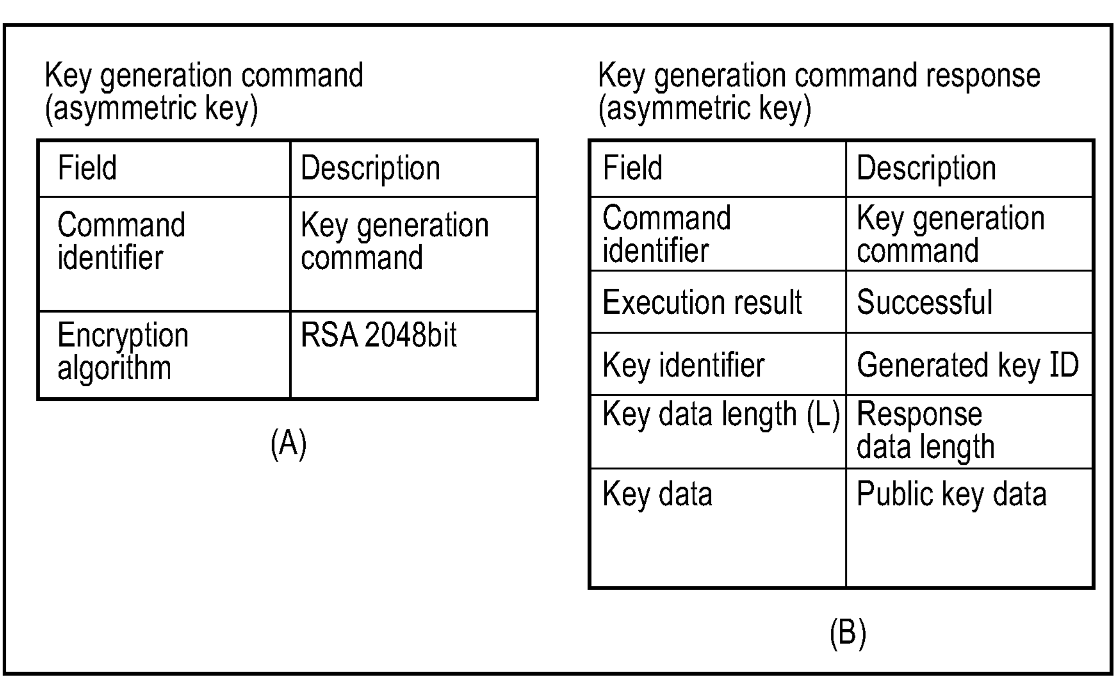

Key generation command (asymmetric key)

| Field | Description |
|---|---|
| Command identifier | Key generation command |
| Encryption algorithm | RSA 2048bit |

(A)

Key generation command response (asymmetric key)

| Field | Description |
|---|---|
| Command identifier | Key generation command |
| Execution result | Successful |
| Key identifier | Generated key ID |
| Key data length (L) | Response data length |
| Key data | Public key data |

Signature command

| Field | Description |
|---|---|
| Command identifier | Signature command |
| Encryption algorithm | RSA2048+SHA256 |
| Key identifier | Key used for signature |
| Data length (L) | Requested data length |
| Requested data | Data to be assigned signature |

(A)

Signature command response

| Field | Description |
|---|---|
| Command identifier | Signature command |
| Execution result | successful |
| Data length | Response data length |
| Response data | Signature value |

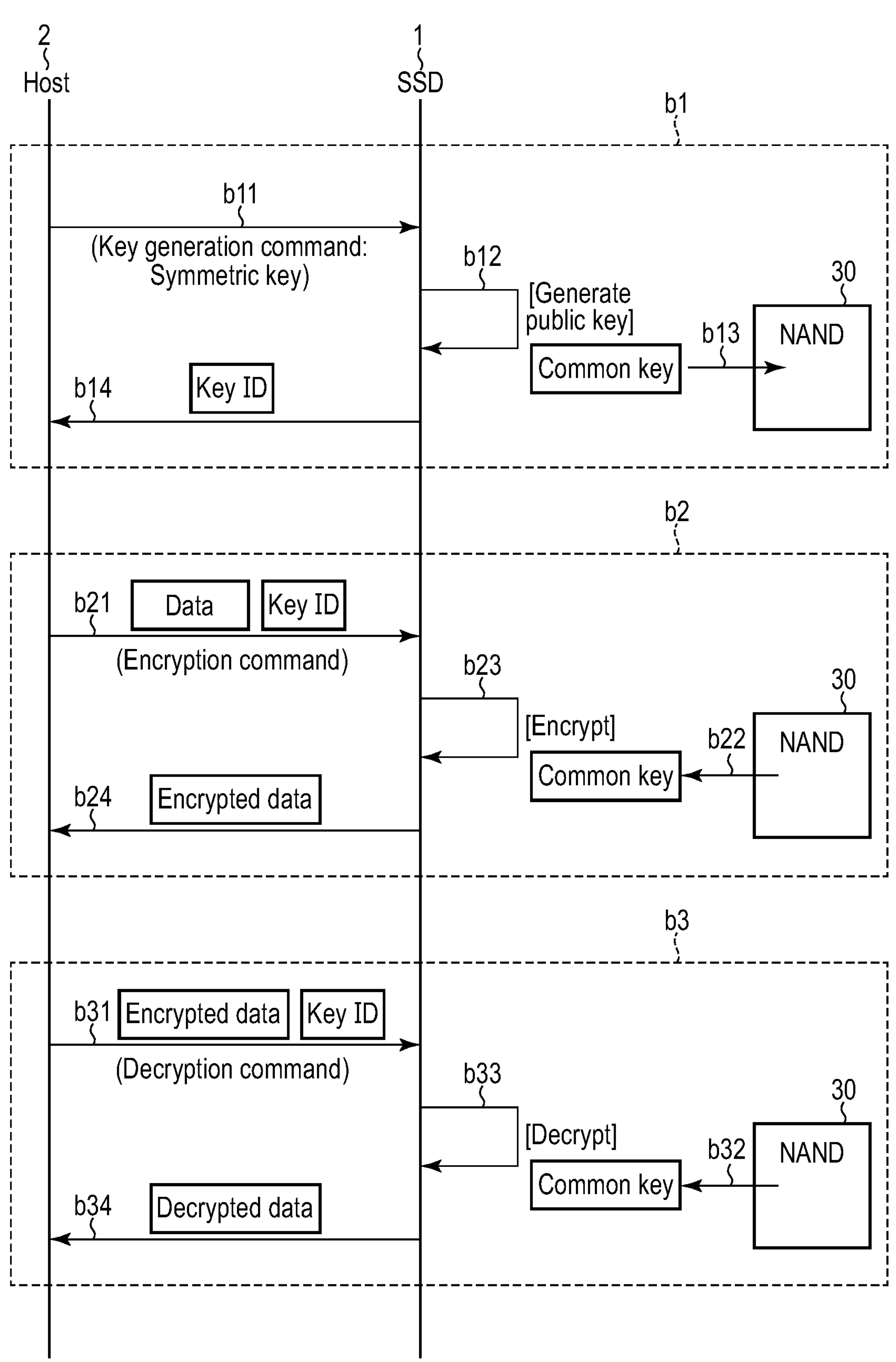
F I G. 8

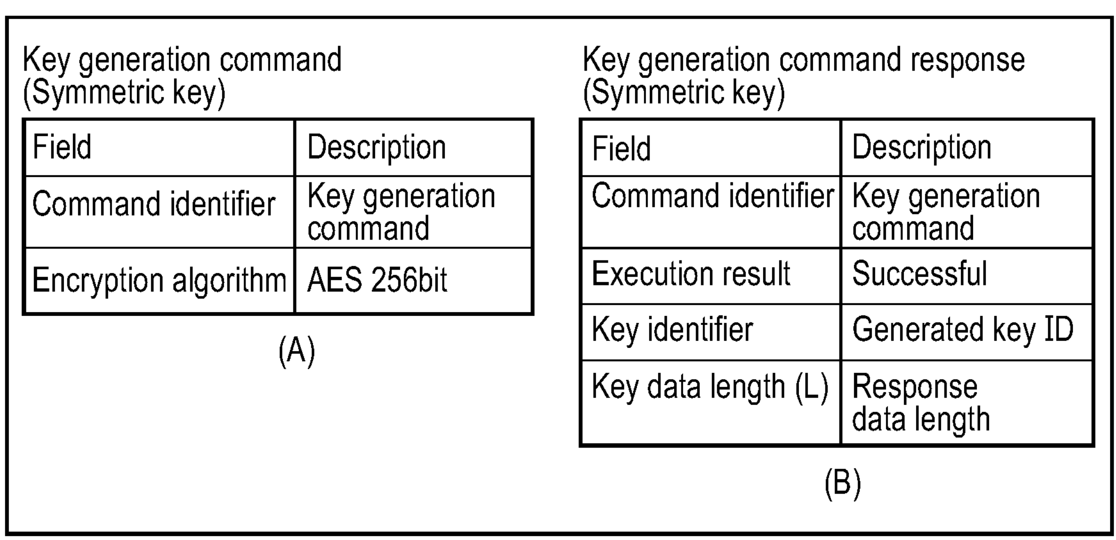

Key generation command (Symmetric key)

| Field | Description |
|---|---|
| Command identifier | Key generation command |
| Encryption algorithm | AES 256bit |

(A)

Key generation command response (Symmetric key)

| Field | Description |
|---|---|
| Command identifier | Key generation command |
| Execution result | Successful |
| Key identifier | Generated key ID |
| Key data length (L) | Response data length |

Encryption command

| Field | Description |
|---|---|
| Command identifier | Encryption command |
| Encryption algorithm | AES 256bit CBC |
| Key identifier | Key used for encryption |
| Data length (L) | Requested data length |
| Requested data | Plain text data to be encrypted |

(A)

Encryption command response

| Field | Description |
|---|---|
| Command identifier | Encryption command |
| Execution result | Successful |
| Data length | Response data length |
| Response data | Data to be encrypted |

| | Password | Key generation command | Signature command | Encryption command | Decryption command | Public key acquisition command |
|---|---|---|---|---|---|---|
| Administrator | $PW_0$ | — | — | — | — | — |
| User 1 | $PW_1$ | ○ | ○ | ○ | ○ | ○ |
| User 2 | $PW_2$ | × | × | ○ | ○ | × |
| User 3 | $PW_3$ | × | × | ○ | × | × |
| ... | | | | | | |

FIG. 11

| | User 1 | User 2 | User 3 | ... |
|---|---|---|---|---|
| $KEY_1$ | ○ | ○ | ○ | |
| $KEY_2$ | × | × | × | |
| $KEY_3$ | × | × | × | |
| ... | | | | |

FIG. 12

MEMORY SYSTEM

CROSS-REFERENCE TO RELATED APPLICATIONS

This application is based upon and claims the benefit of priority from Japanese Patent Application No. 2022-072505, filed Apr. 26, 2022, the entire contents of which are incorporated herein by reference.

FIELD

Embodiments described herein relate generally to a memory system.

BACKGROUND

In recent years, cryptographic techniques such as electronic signatures have been widely used. When using cryptographic techniques such as electronic signatures, for example, it is important for senders to securely manage the encryption keys (private keys) used to generate the electronic signatures.

For this reason, dedicated hardware comprising a function for securely managing encryption keys, which is referred to as hardware security module (HSM), may be introduced in information processing systems that handle confidential data.

However, the introduction of dedicated hardware significantly increases costs. In addition, the number of encryption keys that can be managed by the dedicated hardware is limited to a relatively small number. Furthermore, a mechanism to manage access rights to the dedicated hardware is required.

In contrast, among storages that are essential devices in information processing systems, there exists a storage referred to as a self-encrypting storage, which comprises an encrypting and decrypting function of encrypting data received from the host and writing the data to a storage medium, and decrypting data read from the storage medium in a state of being encrypted and transmitting the data to the host.

BRIEF DESCRIPTION OF THE DRAWINGS

FIG. 1 is a view showing an example of a configuration of a memory system of the embodiment.

FIG. 2 is a view showing an example that a controller divides and manages areas of nonvolatile memory in the memory system of the embodiment.

FIG. 3 is a view showing an example that a controller uses a plurality of encryption keys in the memory system of the embodiment.

FIG. 4 is a view showing examples of extended commands which the memory system of the embodiment can accept.

FIG. 6 is a view showing an example of a key generation command (asymmetric key) among the extended commands used in the memory system of the embodiment and a format of a response thereof.

FIG. 7 is a view showing an example of a signature command among the extended commands used in the memory system of the embodiment and a format of a response thereof.

FIG. 8 is a sequence chart showing a flow of operations related to data encryption and decryption in an information processing system including the memory system of the embodiment.

FIG. 9 is a view showing an example of a key generation command (symmetric key) among the extended commands used in the memory system of the embodiment and a format of a response thereof.

FIG. 10 is a view showing an example of an encryption command among the extended commands used in the memory system of the embodiment and a format of a response thereof.

FIG. 11 is a view showing an example of a table used to manage the authority to issue the extended commands in the memory system of the embodiment.

FIG. 12 is a view showing an example of another table used to manage the authority to issue the extended commands in the memory system of the embodiment.

DETAILED DESCRIPTION

Figure 5:
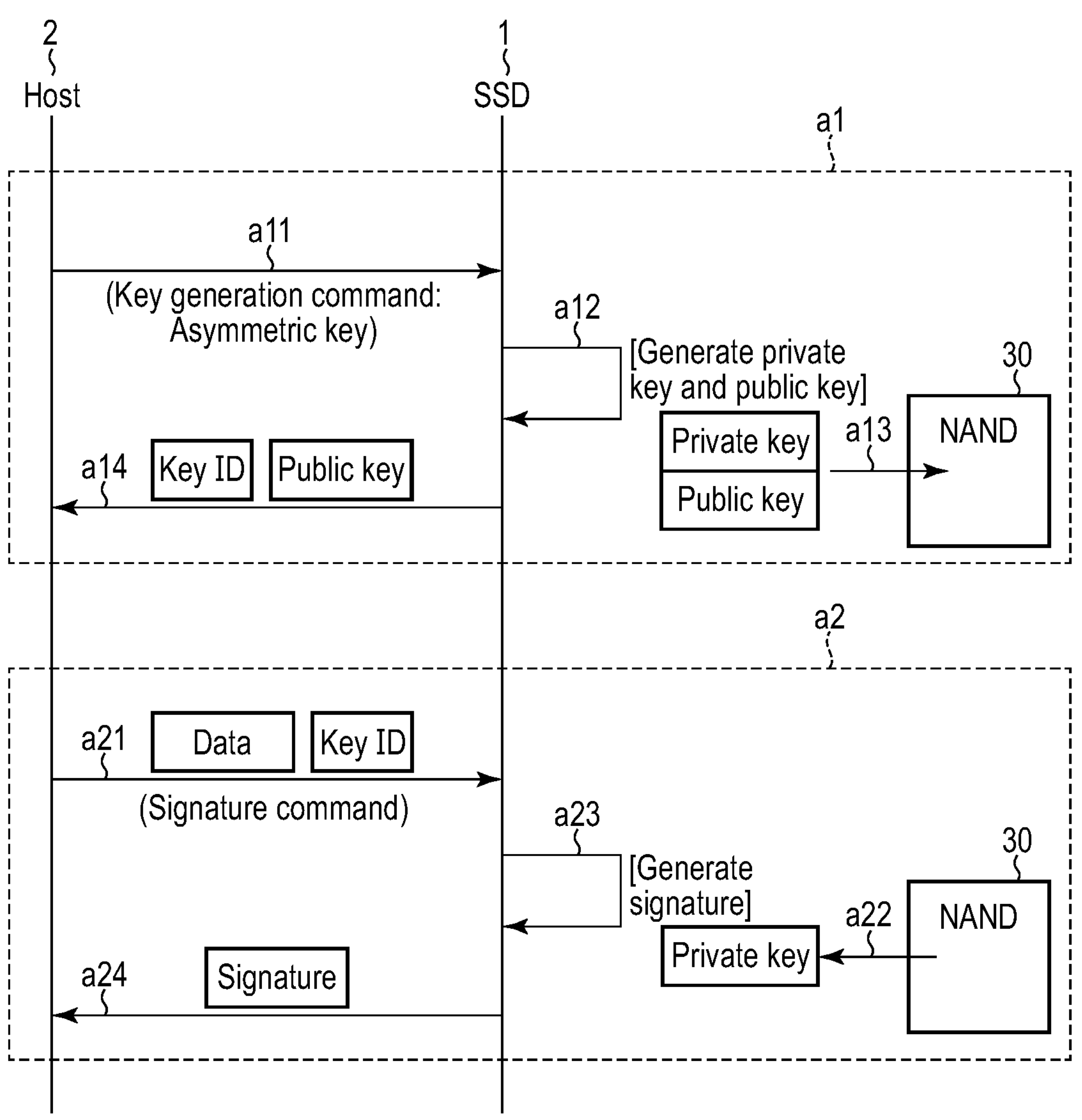
FIG. 5 is a sequence chart showing a flow of operations related to assignment of electronic signatures in an information processing system including the memory system of the embodiment.

In general, according to one embodiment, a memory system includes a nonvolatile memory and a controller. The controller is communicable with a host and is configured to control the nonvolatile memory. The controller is configured to: when receiving a key generation command from the host, generate an encryption key by an encrypting and decrypting function unit, store the encryption key in the nonvolatile memory, and transmit an identifier of the encryption key to the host.

Embodiments will be described hereinafter with reference to the accompanying drawings.

FIG. 1 is a view showing an example of a configuration of a memory system 1 of the embodiment. An example of a configuration of an information processing system including the memory system 1 and a host 2 connected to the memory system 1 is also shown in FIG. 1. The memory system 1 and the host 2 are connected by an interface conforming to, for example, PCIe™ specification.

The memory system 1 is a storage device such as a solid state drive (SSD) or a hard disk drive (HDD). It is exemplified in the figure that an example that the memory system 1 is realized as an SSD including a NAND flash memory (NAND) as a nonvolatile memory 30. The nonvolatile memory 30 is hereinafter referred to as a NAND 30. The SSD 1 communicates with the host 2 using a protocol conforming to, for example, NVMe™ specification. The SSD 1 is a so-called self-encrypting storage that encrypts data received from the host 2 and writes the data to the NAND 30, and decrypts data read from the NAND 30 in a state of being encrypted and transmits the data to the host 2.

The host 2 is an information processing apparatus such as a personal computer or a server. For example, the host 2 executes transmission/reception of various types of data to/from the other host 2. When transmitting the data to the other host 2, the host 2 may generate an electronic signature which allows a recipient to confirm that the data has been transmitted from an authenticated counterpart and that the data has not been falsified, and may assign the electronic signature to the data. In general, public key cryptography is used for electronic signatures. The host 2 generates an electronic signature corresponding to the data to be transmitted, using a private key of the host 2. The public key is shared by the data recipient and the host 2. The method of sharing is arbitrary. The recipient uses the public key passed from the sender to confirm that the granted electronic signature corresponds to the received data, i.e., that the data has been transmitted from the authenticated counterpart and has not been falsified.

Alternatively, when the host 2 is the data recipient, the data for the host 2 is encrypted using the public key of the host 2 by the sender and then transmitted. The host 2 decrypts the encrypted data using the private key of the host 2. Since the encrypted data which has been encrypted with the public key of the host 2 can only be decrypted with the private key of the host 2, data leakage on a communication path can be prevented.

In addition, for example, when uploading and storing the data to a file server in the cloud, the host 2 encrypts the data. In data encryption in such a case, a public key cryptography is generally used. The private key and the public key of the above-described public key cryptography are referred to as asymmetric keys since different keys are used for the encryption and decryption. In contrast, encryption keys of common key cryptography are referred to as symmetric keys since the same keys (common keys) are used for the encryption and decryption.

It is important to securely manage the encryption keys such as private keys and common keys. Introduction of dedicated hardware referred to as HSM or the like to securely manage the encryption keys leads to the various problems described above such as a significant increase in costs. The SSD 1 of the embodiment provides the host 2 with a function to securely manage the encryption keys by utilizing the encryption/decryption function of the self-encrypting storage. Since the storage is an essential device in the information processing system, the feature that the SSD 1 provides the host 2 with a function to securely manage the encryption keys realizes reduction in the costs of introducing the function to securely manage the encryption keys.

As shown in FIG. 1, the SSD 1 includes a controller 10, a volatile memory 20, and the NAND 30. The volatile memory 20 is, for example, a dynamic RAM [random access memory] (DRAM).

In response to a command from the host 2, the controller 10 executes processing corresponding to the command while using the DRAM 20 as a work area and transmits the result to the host 2. The controller 10 is configured as, for example, a system on a chip (SoC). The controller 10 may incorporate, for example, a static RAM (SRAM) and use the SRAM in the controller as a work area, instead of using the externally connected DRAM 20 as a work area. In other words, a configuration in which the DRAM 20 does not exist may be considered as the configuration of the SSD 1.

User data transmitted from host 2 is stored in the NAND 30. The controller 10 manages the area of the NAND 30 by dividing the area into a system data area 31 and a user data area 32 as shown in, for example, FIG. 2. The system data area 31 is an area that is kept secret for the host 2. In other words, the system data area 31 is an area that cannot be accessed by the host 2.

The controller 10 generates an encryption key for encrypting the user data. When writing the user data to the user data area 32 of the NAND 30, the controller 10 encrypts the user data using the generated encryption key and writes the user data to the user data area 32 of the NAND 30.

In contrast, when reading the user data from the user data area 32 of the NAND 30, the controller 10 also generates an encryption key. The controller 10 uses the generated encryption key to decrypt the user data that is read from the user data area 32 of the NAND 30 in the state of being encrypted.

In addition, the SSD 1 of the embodiment, which is a self-encrypting storage, can generate and manage a plurality of encryption keys and encrypt and decrypt the user data by using different keys for each block provided in the user data area 32 as shown in, for example, FIG. 3. For example, the controller 10 can associate identification information (ID) with the blocks by applying an authentication function conforming to trusted computing group (TCG) specifications developed for storages. This association is executed in response to a command from the host 2 when authentication is established with the ID for administrator. The controller 10 also executes, for example, setting the ID for general user, which is granted to the operator of the host 2, in response to a command from the host 2 when authentication is established with the ID for administrator. For example, when an ID for general user is set, an initial password is set as a password to establish authentication with the ID for general user. This password is changed in response to a command from the host 2 when authentication is established with the ID for general user using the initial password. The password of the ID for general user cannot be updated or even referred to even if authentication is established with the ID for administrator.

The ID for administrator is prepared in advance, and an initial password is set as the password to establish authentication with the ID for administrator. This password is changed in response to a command from the host 2 when authentication is established with the ID for administrator using the initial password. The initial password for the ID for administrator is, for example, a value granted to each SSD 1, and the initial password for the ID user is, for example, a predetermined value common to all IDs for users.

For example, if the operator of the host 2 uses the ID to establish authentication in a situation where an ID is associated with a block A and a block B, the controller 10 permits access only to the block A and the block B in the user data area 32. In this case, the controller 10 encrypts the data with a key A for block A when requested to write data to the block A, and encrypts the data with a key B for block B when requested to write data to the block B. Similarly, the controller 10 executes decryption with the key A for block A when reading the data from the block A, and executes decryption with the key B for block B when reading the data from the block B.

The controller 10 can associate a plurality of IDs with a single block. For example, the controller 10 can associate an ID different from the above-described ID with the block B and the block C. In this case, the controller 10 permits access to the block B even if authentication is established with any of the two IDs. The key used to encrypt and decrypt the data to be written to the block B is the key B for block B regardless of the ID used for authentication. The controller 10 can also provide blocks in which data encryption is not executed. Setting encryption or no encryption for each block is also executed in response to a command from the host 2 when authentication is established with the ID for administrator.

The controller 10 includes a central processing unit (CPU) 11, an interface 12, an encryption engine 13, and encryption and decryption hardware 14 as elements related to providing the function of securely managing the encryption key to the host 2.

The CPU 11 executes a program referred to as firmware or the like to realize the various processing units such as a key management command processing unit 101, an authentication processing unit 102, an encryption control unit 103, and a key management unit 104 shown in FIG. 1. These various processing units may be realized as hardware such as electric circuits. Details of these various processing units will be described below. An encrypting and decrypting function unit 150 is constituted by the encryption control unit 103, the key management unit 104, and the encryption engine 13 and the encryption and decryption hardware 14 described above. The self-encrypting storage that encrypts and decrypts the data transmitted from the host 2 can be realized by comprising such a configuration.

The interface 12 controls receiving the data from the host 2 and transmitting the data to the host 2. The encryption engine 13 generates encryption keys, generates electronic signatures for specified data using specified encryption keys, and encrypts or decrypts specified data using specified encryption keys, under the control of the CPU 11. The encryption engine 13 can correspond to a plurality of encryption algorithms such as RSA, ECDSA, and AES.

FIG. 1 will also be referred to for descriptions of the HSM function. The controller 10 encrypts the data transmitted from the host and transmits the data to the host in response to the request of the host 2. In addition, the controller 10 decrypts the encrypted data transmitted from the host and transmits the data to the host in response to the request from the host 2. Furthermore, the controller generates encryption keys such as private keys and common keys and transmits the keys to the host in response to the request from the host.

The controller 10 stores the encryption keys such as private keys and common keys used by the encryption engine 13, in the NAND 30. In order to securely manage these encryption keys in the SSD 1, the encryption and decryption hardware 14 encrypts the encryption the keys stored in the NAND 30. In addition, the encryption and decryption hardware 14 decrypts the encryption keys read from the NAND 30 in the state of being encrypted. The encryption keys for encrypting and decrypting the encryption keys are generated by the encryption engine 13, managed by the key management unit 104, and set in the encryption and decryption hardware 14.

The key management command processing unit 101 accepts from the host 2 extended commands to make the SSD 1 of the embodiment operate similarly to the hardware such as HSM. The key management command processing unit 101 controls the processing corresponding to the extended commands and transmits the processing results to the host 2. The extended commands will be described below.

The authentication processing unit 102 authenticates the operator of the host 2. For example, the authentication processing unit 102 provides authentication functions that conform to TCG specification. The authentication processing unit 102 requests the operator of the host 2 to input his/her ID and password, and verifies the input ID and password to determine whether the authentication is successful or not. The authentication processing unit 102 also sets the operator's ID. The authentication executed by the authentication processing unit 102 is originally carried out to determine presence or absence of a right to access each block of the NAND 30 from the host 2. The SSD 1 of the embodiment also utilizes the authentication executed by the authentication processing unit 102 to determine presence or absence of a right to issue extended commands.

The encryption control unit 103 transmits the data transmitted from the host 2 and the encryption key transmitted from the key management unit 104 to be described below to the encryption engine 13. The encryption engine 13 encrypts the data using the encryption key received from the encryption control unit 103. The encryption engine 13 transmits the encrypted data to the encryption control unit 103. The encryption control unit 103 transfers the encrypted data to the key management command processing unit 101. The key management command processing unit 101 transmits the encrypted data back to the host. In this case, the encryption key is, for example, a common key in the common key cryptography. Encryption of the data using the public key in the public key cryptography is executed on, for example, the host 2 which has obtained the public key from the SSD 1.

In addition, the encryption control unit 103 transmits the encrypted data transmitted from the host 2 to the encryption engine 13. The encryption control unit 103 receives the encryption key specified by the host 2 from the key management unit 104 and transmits this key to the encryption engine 13. The encryption engine 13 decrypts the encrypted data using the encryption key received from the encryption control unit 103 and transmits the data to the encryption control unit 103. The encryption control unit 103 transfers the decrypted data to the key management command processing unit 101. The key management command processing unit 101 transmits the decrypted data back to the host. In this case, the encryption key is, for example, a common key in the common key cryptography or a private key in the public key cryptography.

The key management unit 104 manages the encryption keys specified by the host 2. The key management unit 104 may hold, for example, an encryption key management table in which the encryption keys are associate with identification codes. When receiving an instruction to generate an encryption key from the key management processing unit 101, the key management unit 104 generates the encryption key and associates the identification code with the encryption key by referring to the encryption key management table. The key management unit 104 transmits the generated encryption key to the encryption control unit 103. In addition, when receiving a key ID from the key management processing unit 101, the key management unit 104 reads the encryption key associated with the key ID from the NAND 30 by referring to the encryption key management table and transmits the encryption key to the encryption control unit 103. The key ID is an ID that identifies various encryption keys.

In other words, the SSD 1 of the embodiment can realize the self-encrypting storage that encrypts and decrypts the data transmitted from the host 2, by using the encrypting and decrypting function unit 150 as, for example, a function unit for securely managing the encryption keys such as the private key used to generate electronic signatures and the common key used to encrypt or decrypt the data.

FIG. 4 is a view showing examples of the extended commands.

The extended commands are roughly divided into two types of commands, i.e., commands related to the management of the encryption keys (corresponding to HSM) and commands related to user authentication (corresponding to TCG).

A key generation command is a command that requests generation of the private key and the public key (asymmetric keys) for electronic signatures, or encryption keys (symmetric keys) for encryption or decryption. A signature command is a command that requests generation of electronic signatures. An encryption command is a command that requests encryption of the data. A decryption command is a command that requests decryption of the encrypted data. A public key acquisition command is a command that requests transfer of the public key of the already generated private and public keys.

A user setting command is a command that requests setting of the ID for general user. A user setting command is a command that can be accepted when authentication is established with the ID for administrator. When a command related to management of the encryption keys is issued, the ID for general user is used to determine whether or not the command can be accepted. An authority setting command is a command that requests setting of presence or absence of an authority to issue various commands corresponding to HSM in relation to a certain ID for general user. The authority setting command is also a command that can be accepted when authentication is established with the ID for administrator. A password change command is a command that requests change of the passwords for the ID for administrator and the ID for general user. The change of the password using the password change command is valid only for the password for the ID for which authentication has been established.

A flow of operations of the host 2 and the SSD 1 regarding the assignment of electronic signatures will be described with reference to FIG. 5. It is assumed that authentication is established with an ID for general user who is authorized to issue the key generation command. The assignment of the electronic signature is roughly classified into a phase (a1) to generate a private key and a public key and a phase (a2) to generate an electronic signature using the private key.

The host 2 issues a key generation command for the SSD 1 (a11). It can be determined which of generation of an asymmetric key and generation of a symmetric key is requested by the key generation command, by, for example, the encryption algorithm specified by a parameter. It is assumed here that a key generation command for specifying the encryption algorithm indicating the asymmetric key with a parameter has been issued.

The key generation command issued by the host 2 is supplied to the key management command processing unit 101 via the interface 12. The key management command processing unit 101 asks the authentication processing unit 102 whether the key generation command can be accepted or not. Since it is assumed that authentication has been established with the ID for general user that has been granted the authority to issue the key generation command, the authentication processing unit 102 notifies the key management command processing unit 101 that the key generation command can be accepted.

If the key generation command can be accepted, the key management command processing unit 101 instructs the key management unit 104 to generate the private key and the public key. Upon receiving this instruction, the key management unit 104 generates the private key and the public key (a12). The key management unit 104 stores the generated private and public keys in the system data area 31 of the NAND 30 via the encryption and decryption hardware 14 (a13). At this time, the encryption and decryption hardware 14 encrypts the private key and the public key. The key management unit 104 transfers the generated key ID and the public key of the private and public keys to the key management command processing unit 101. The encryption and decryption hardware 14 consists of a logic circuit comprising the function of an encipherment device which encrypts a key and the function of a decipherment device which decrypts the encrypted key. The encryption and decryption hardware 14 realizes an encryption algorithm such as the Advanced Encryption Standard (AES). These functions of encryption and decryption are not limited to hardware and can be realized by software.

The key management command processing unit 101 transmits the key ID and the public key received from the key management unit 104 as a response to the key generation command to host 2 via interface 12 (a14). While storing the key ID, the host 2 shares the public key with the recipient of the data which it transmits. The method of sharing is arbitrary. The host 2 may hold this public key or may obtain the public key from the SSD 1 as appropriate by issuing the public key acquisition command.

When generating the private key and public key for electronic signature, assigning an electronic signature to the data and transmitting the data to the other host 2, the host 2 issues a signature command including the key ID and the data to be transmitted (a21).

The signature command issued by the host 2 is supplied to the key management command processing unit 101 via the interface 12. The key management command processing unit 101 extracts the key ID included in the signature command and instructs the key management unit 104 to read the private key indicated by the key ID. The key management unit 104 reads the specified private key from the system data area 31 of the NAND 30 via the encryption and decryption hardware 14 (a22). At this time, the encryption and decryption hardware 14 decrypts the encrypted private key. The key management unit 104 transfers this private key to the encryption control unit 103.

The key management command processing unit 101 instructs the key management unit 104 to read the private key and simultaneously instructs the encryption control unit 103 to generate a signature corresponding to the data retrieved from the signature command. The encryption control unit 103 supplies the private key received from the key management unit 104 and the data received from the key management command processing unit 101 to the encryption engine 13 and causes the encryption engine 13 to generate an electronic signature (a23).

The encryption control unit 103 transfers the electronic signature generated by the encryption engine 13 to the key management command processing unit 101. The key management command processing unit 101 transmits this electronic signature to the host 2 via the interface 12 (a24).

FIG. 6 shows an example of a format of a key generation command requesting the generation of an asymmetric key and its response.

As shown in FIG. 6(A), the key generation command includes a command identifier field and an encryption algorithm field. In the case of the key generation command, a value indicating the key generation command is stored in the command identifier field. A value indicating the algorithm used for the key generation is stored in the encryption algorithm field. The value of the encryption algorithm field is also used as information to determine whether the key generation command requests the generation of an asymmetric key or a symmetric key. In this example, RSA 2048 bit is specified as the encryption algorithm. RSA 2048 bit is an encryption algorithm that uses asymmetric keys.

In contrast, as shown in FIG. 6(B), the response to the key generation command for an asymmetric key includes a command identifier field, an execution result field, a key identifier field, a key data length (L) field, and a key data field. A value that allows a plurality of key generation commands to be distinguished from each other is stored in the command identifier field. A value indicating the success or failure of the process corresponding to the command is stored in the execution result field. The identifier (key ID) of the generated cryptographic keys (private key and public key) is stored in the key identifier field. The size of the public key to be transferred to the issuer of the key generation command is stored in the key data length (L) field. The public key of the generated private and public keys is stored in the key data field. The private key is never output to the outside of the SSD 1.

In addition, FIG. 7 shows an example of a format of the signature command and its response.

As shown in FIG. 7(A), the signature command includes a command identifier field, an encryption algorithm field, a key identifier field, a data length (L) field, and a request data field. A value that allows a plurality of signature commands to be distinguished from each other is stored in the command identifier field. A value indicating the encryption algorithm used to generate the signature is stored in the encryption algorithm field. In this example, RSA 2048+SHA256 is specified. The identifier (key ID) of the key used to generate the signature is stored in the key identifier field. The size of the data to which the signature is granted is stored in the data length (L) field. The data to which a signature is to be granted is stored in the request data field.

The response to the signature command includes a command identifier field, an execution result field, a data length field, and a response data field, as shown in FIG. 7(B). A value that allows a plurality of signature commands to be distinguished from each other is stored in the command identifier field. A value indicating the success or failure of the process corresponding to the command is stored in the execution result field. The size of the generated electronic signature is stored in the data length field. The generated electronic signature is stored in the response data field.

Thus, the SSD 1 of the embodiment encrypts the data of the host 2 and stores the data in the NAND as the self-encryption storage, and further provides functions to generate private and public keys for electronic signatures and to securely manage the private keys by utilizing the function of the self-encrypting storage. The function of the self-encrypting storage provided in the SSD 1 of the embodiment can replace the dedicated hardware referred to as HSM or the like. The costs of introducing the function to securely manage the encryption key can be reduced by providing the host 2 with the function of the SSD 1 of the embodiment to securely manage the encryption key.

In addition, the SSD 1 of the embodiment managing the encryption keys in the system data area 31 of the NAND 30 can significantly increase the number of encryption keys that can be managed as compared with the number of keys that can be managed by dedicated hardware referred to as HSM or the like. Furthermore, a mechanism of managing the authority to issue the key generation command to request generation of the asymmetric key and the public key acquisition command can be constructed by, for example, applying an authentication function conforming to the TCG specification developed for storages. The data can be thereby managed more securely than that in an information processing system including the conventional memory system.

Next, a flow of operations of the host 2 and the SSD 1 regarding the data encryption and decryption will be described with reference to FIG. 8. In this example, too, it is assumed that authentication is established with an ID for general user who is authorized to issue the key generation command. The data encryption and decryption is roughly classified into a phase (b1) to generate the encryption key and phases (b2 and b3) to encrypt or decrypt the data using the encryption key.

The host 2 issues the key generation command to the SSD 1 (b11). It can be determined which of generation of an asymmetric key or a symmetric key is requested by the key generation command, by, for example, the encryption algorithm specified by a parameter, as described above. It is assumed that the key generation command to specify the encryption algorithm indicating the asymmetric key with a parameter has been issued.

The key generation command issued by the host 2 is supplied to the key management command processing unit 101 via the interface 12. The key management command processing unit 101 asks the authentication processing unit 102 whether the key generation command can be accepted or not. Since it is assumed that authentication has been established with the ID for general user that has been granted the authority to issue the key generation command, the authentication processing unit 102 notifies the key management command processing unit 101 that the key generation command can be accepted.

If the key generation command is can be accepted, the key management command processing unit 101 instructs the key management unit 104 to generate the common key. Upon receiving this instruction, the key management unit 104 generates the common key (b12). The key management unit 104 stores the generated common key in the system data area 31 of the NAND 30 via the encryption and decryption hardware 14 (b13). At this time, the encryption and decryption hardware 14 encrypts the common key. The key management unit 104 transfers the ID (key ID) of the generated common key to the key management command processing unit 101.

The key management command processing unit 101 transmits the key ID received from the key management unit 104, as a response to the key generation command, to the host 2 via the interface 12 (b14). The host 2 stores this key ID.

After generating the common key for encryption, for example, when uploading the data to a file server in the cloud to store the data, the host 2 encrypts the data. The host 2 issues an encryption command including the key ID and the data to be encrypted (b21). The encryption command issued by the host 2 is supplied to the key management command processing unit 101 via the interface 12. The key management command processing unit 101 extracts the key ID included in the encryption command and instructs the key management unit 104 to read the common key indicated by the key ID. The key management unit 104 reads the specified common key from the system data area 31 of the NAND 30 via the encryption and decryption hardware 14 (b22). At this time, the encryption and decryption hardware 14 decrypts the encrypted common key. The key management unit 104 transfers this common key to the encryption control unit 103.

The key management command processing unit 101 instructs the key management unit 104 to read the common key and simultaneously instructs the encryption control unit 103 to encrypt the data retrieved from the encryption command. The encryption control unit 103 supplies the common key received from the key management unit 104 and the data received from the key management command processing unit 101 to the encryption engine 13 and causes the encryption engine 13 to encrypt the data (b23).

The encryption control unit 103 transfers the data (encryption data) encrypted by the encryption engine 13 to the key management command processing unit 101. The key management command processing unit 101 transmits this encrypted data to the host 2 via the interface 12 (b24).

In addition, for example, when decrypting the encrypted data stored on a file server in the cloud to download and use the encrypted data, the host 2 issues a decryption command that includes the key ID and the data to be decrypted (b31). The decryption command issued by the host 2 is supplied to the key management command processing unit 101 via the interface 12. The key management command processing unit 101 extracts the key ID included in the decryption command and instructs the key management unit 104 to read the common key indicated by the key ID. The key management unit 104 reads the specified common key from the system data area 31 of the NAND 30 via the encryption and decryption hardware 14 (b32). At this time, the encryption and decryption hardware 14 decrypts the encrypted common key. The key management unit 104 transfers this common key to the encryption control unit 103.

The key management command processing unit 101 instructs the key management unit 104 to read the common key and simultaneously instructs the encryption control unit 103 to decrypt the encrypted data retrieved from the encryption command. The encryption control unit 103 supplies the common key received from the key management unit 104 and the data received from the key management command processing unit 101 to the encryption engine 13 and causes the encryption engine 13 to decrypt the encrypted data (b33).

The encryption control unit 103 transfers the data decrypted by the encryption engine 13 to the key management command processing unit 101. The key management command processing unit 101 transmits this data to the host 2 via the interface 12 (b34).

FIG. 9 shows an example of a format of the key generation command requesting the generation of the symmetric key and its response.

As shown in FIG. 9(A), the key generation command includes a command identifier field and an encryption algorithm field. A value that allows a plurality of key generation commands to be distinguished from each other is stored in the command identifier field. A value indicating the algorithm used for the key generation is stored in the encryption algorithm field. As described above, the value of the encryption algorithm field is also used to determine which of the generation of the asymmetric key and the symmetric key is requested by the key generation command. In this example, AES 256 bit is specified as the encryption algorithm. AES 256 bit is the encryption algorithm that uses symmetric keys.

In contrast, as shown in FIG. 9(B), the response to the key generation command for symmetric keys includes a command identifier field, an execution result field, a key identifier field, and a key data length (L) field. The differences from the above-described response to the key generation command for asymmetric keys are that the value of the key data length (L) field is always 0 and that there is no key data field. The common key is never output to the outside of the SSD 1.

In addition, FIG. 10 shows an example of a format of the encryption command and its response.

As shown in FIG. 10(A), the encryption command includes a command identifier field, an encryption algorithm field, a key identifier field, a data length (L) field, and a request data field. A value that allows a plurality of encryption commands to be distinguished from each other is stored in the command identifier field. A value indicating the encryption algorithm used to encrypt the data is stored in the encryption algorithm field. In this example, AES 256 bit CBC is specified. The identifier (key ID) of the key used to encrypt the data is stored in the key identifier field. The size of the data to be encrypted is stored in the data length (L) field. The data to be encrypted is stored in the request data field.

The response to the encryption command includes a command identifier field, an execution result field, a data length field, and a response data field, as shown in FIG. 10(B). A value that allows a plurality of encryption commands to be distinguished from each other is stored in the command identifier field. A value indicating the success or failure of the process corresponding to the command is stored in the execution result field. The size of the data to be encrypted (encrypted data) is stored in the data length field. The encrypted data is stored in the response data field.

The format of the decryption command and its response is the same as the format of the encryption command and its response and, encrypted data is stored in the request data field and unencrypted data is stored in the response data field, in a manner opposite to that of the encryption command and its response.

Thus, the SSD 1 of the embodiment encrypts the data of the host 2 and stores the data in the NAND as the self-encryption storage, and further provides functions to generate common keys for encryption and to securely manage the common keys by utilizing the function of the self-encrypting storage. The function of the self-encrypting storage provided in the SSD 1 of the embodiment can replace the dedicated hardware referred to as HSM or the like. As described above, the costs of introducing the function to securely manage the encryption key can be reduced by providing the host 2 with the function of the SSD 1 of the embodiment to securely manage the encryption key.

In addition, the SSD 1 of the embodiment managing the encryption keys in the system data area 31 of the NAND 30 can significantly increase the number of encryption keys that can be managed as compared with the number of keys that can be managed by dedicated hardware referred to as HSM or the like. Furthermore, a mechanism of managing the authority to issue the key generation command to request generation of the symmetric key can be constructed by, for example, applying an authentication function conforming to the TCG specification developed for storages. The data can be thereby managed more securely than that in an information processing system including the conventional memory system.

Next, an example in which the SSD 1 of the embodiment manages the authority to issue various commands corresponding to HSM will be described with reference to FIG. 11. In this management method, for example, since the authentication function conforming to the TCG specification developed for storage is applied, the SSD 1 of the embodiment can accept the user setting command, the authority setting command, and the password change command as commands (extended commands) corresponding to TCG.

The operator (administrator) of the host 2 who has established authentication with the ID for administrator can set the ID for general user using the user setting command. In addition, the administrator can set presence or absence of the right to issue various commands corresponding to HSM, such as key generation commands, using the authority setting command for the set ID for general user. When setting the IDs for general users with the user setting commands, the administrator can set the maximum number of encryption keys that can be held.

The operator (general user) of the host 2 who has established authentication with the ID for general user can use the password change command to change the password used for the authentication with the ID for general user. The administrator can also use this password change command to change the password used for the authentication with the ID for administrator.

The user setting command, the authority setting command or the password change command issued by the host 2 is supplied to the key management command processing unit 101 via the interface 12. The key management command processing unit 101 instructs the authentication processing unit 102 to set the user, set the authority to issue the command, or change the password. The authentication processing unit 102 executes processing corresponding to the instructions from the key management command processing unit 101 and manages the results as a table as shown in, for example, FIG. 11. This table is also stored in the system data area 31 of the NAND 30.

The table of FIG. 11 shows a state in which at least three IDs for general users (user 1, user 2, and user 3) are set by the administrator. In addition, the table shows a setting state in which user 1 has the authority to issue any of the key generation command, the signature command, the encryption command, the decryption command, and the public key acquisition command, user 2 has the authority to issue the encryption command and the decryption command, and user 3 has the authority to issue only the encryption command. The table also shows that the password is managed for each of the ID for administrator and the three IDs for general users.

In this case, user 1 obtains the key ID and the public key by issuing the key generation command that requests the generation of an asymmetric key, and issues the signature command including this key ID and the data. User 1 can thereby generate the signature corresponding to the data which allows its authentication to be confirmed with the only public key. In addition, user 1 can obtain the key ID by, for example, issuing the key generation command that requests the generation of the symmetric key, and encrypt the data by issuing the encryption command including this key ID and the data. User 1 can decrypt the encrypted data by issuing the decryption command that includes the key ID and the encrypted data. As described above, the private key for signature and the common key for encryption are never output to the outside of the SSD 1.

User 2 having no authority to issue the key generation commands can encrypt the data and decrypt the encrypted data by issuing the encryption command or decryption command having the authority to issue with, for example, the key ID of the symmetric key (common key) generated by user 1. However, since User 2 does not have the authority to issue the signature commands, the user cannot generate signatures using the asymmetric key (private key) generated by user 1.

The authentication processor 102 may further maintain a table as shown in, for example, FIG. 12. This table indicates whether or not the authority to issue assigned to each user extends to each key. By managing such a table, for example, the authority to issue the encryption command and the decryption command as granted to user 2 can be limited to only the key (KEY1) generated by user 1 described above. In other words, it is possible to prohibit user 2 from encrypting the data or decrypting the encrypted data using KEY2 or KEY3.

Since user 3 does not have the authority to issue the decryption command, for example, the user can encrypt the data using the symmetric key (common key) generated by user 1, but cannot decrypt the encrypted data.

The user can be set not to have the authority to issue any commands with a certain ID for general user. When authentication is established with this ID for general user, the SSD 1 functions only as a self-encrypting storage.

Thus, the SSD 1 of the embodiment can establish a mechanism to manage the authority to issue various commands corresponding to HSM by, for example, by applying an authentication function that conforms to the TCG specification.

As described above, the SSD 1 of the embodiment realizes a reduction in the costs of introducing the function to securely manage the encryption keys by utilizing the existing encryption and decryption function provided as the self-encrypting storage. In addition, the SSD 1 can significantly increase the number of encryption keys that can be managed as compared with the dedicated hardware referred to as HSM. Furthermore, a mechanism of managing the authority to issue various commands corresponding to HSM can be constructed by, for example, applying an authentication function conforming to the TCG specification developed for storages.

It has been assumed in the above descriptions that the common key cryptography is used for data encryption and decryption, but the public key cryptography can also be used for data decryption. For example, the host 2 issues the key generation command that requests generation of the asymmetric key. The SSD 1 generates the private key and the public key. The host shares the public key between the host 2 and the sender who transmits the data to the host 2. The method of sharing is arbitrary. The data is encrypted using the public key of the host 2 and transmitted to the host 2 by the sender. When the encrypted data is received, the encrypted data is decrypted by issuing the decryption command that includes the key ID of the private key and the encrypted data. In this case, too, the private key is securely managed without being output to the outside of the SSD 1.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:

a nonvolatile memory; and a controller which is communicable with a host and configured to control the nonvolatile memory, wherein the controller is configured to:

in response to receiving a key generation command from the host, generate an encryption key by an encrypting and decrypting function unit, store the encryption key in a system data area of the nonvolatile memory, wherein the system data area is managed exclusively by the controller and not mapped to any logical address space accessible to the host, associate the encryption key with a key identifier, and transmit only the key identifier to the host without transmitting the encryption key, in response to receiving, from the host, an encryption command including the key identifier and data to be encrypted, read, from the system data area of the nonvolatile memory, the encryption key indicated by the key identifier, encrypt the data using the encryption key read from the system data area, and transmit the encrypted data to the host.

2. The memory system of claim 1, wherein:

the controller comprises an encrypting and decrypting function unit of a self-encrypting storage;

the encrypting and decrypting function unit is configured to generate an encryption key, manage the encryption key using the nonvolatile memory, and encrypt data written to the nonvolatile memory using the encryption key or decrypt data read from the nonvolatile memory in a state of being encrypted.

3. The memory system of claim 1, wherein the controller is configured to:

when receiving a decryption command including the identifier and encrypted data to be decrypted from the host, decrypt the encrypted data using an encryption key indicated by the identifier, by the encrypting and decrypting function unit; and transmit the decrypted data to the host.

4. The memory system of claim 1, wherein the controller is configured to:

when the key generation command is a command to request generation of an asymmetric key, generate a public key and a private key, by the encrypting and decrypting function unit;

manage the public key and the private key using the nonvolatile memory; and transmit the identifier of the public key and the private key, and the public key to the host.

5. The memory system of claim 4, wherein the controller is configured to:

when receiving a signature command from the host, receive identifiers of the public key and the private key and data to be granted a signature, read the private key indicated by the identifiers from the nonvolatile memory, generate an electronic signature corresponding to the data based on the private key and the data, by the encrypting and decrypting function unit, and transmit the electronic signature to the host.

6. The memory system of claim 5, wherein the controller is configured to:

when receiving a decryption command including the identifiers indicating the public key and the private key and including encrypted data to be decrypted from the host, decrypt the encrypted data using the private key of the public key and the private key; and transmit the decrypted data to the host.

7. The memory system of claim 4, wherein the controller is configured to:

when receiving a public key acquisition command including the identifiers indicating the public key and the private key from the host, transmit the public key of the public key and the private key which are stored in the nonvolatile memory by the encrypting and decrypting function unit to the host.

8. The memory system of claim 1, wherein:

the encrypting and decrypting function unit is capable of corresponding to a plurality of encryption algorithms;

the key generation command specifies the encryption algorithm; and the controller is configured to determine whether the key generation commands requests generation of an asymmetric key or a symmetric key, based on a specified encryption algorithm.

9. The memory system of claim 1, wherein:

the controller further comprises an authentication processing unit configured to authenticate an operator of the host, based on identification information of the operator of the host; and the controller is configured to determine whether or not the command, from the host, to request processing related to the encrypting and decrypting function unit is acceptable, in accordance with a result of the authentication executed by the authentication processing unit.

10. The memory system of claim 9, wherein the authentication processing unit is configured to execute authentication conforming to trusted computing group (TCG) specification.

11. The memory system of claim 1, wherein:

the controller is configured to transmit a key data length indicated a size of key to be transferred to the host.

* * * * *